United States Patent

Etherington, Jr. et al.

[15] 3,673,255
[45] June 27, 1972

[54] CATALYTIC OXIDATIVE DEHYDROGENATION OF KETONES WITH IMPROVED SUPPORTED GOLD CATALYST

[72] Inventors: Robert W. Etherington, Jr., Pennington; Koei-Liang Liauw, Murray Hill, both of N.J.

[73] Assignee: Mobil Oil Corporation

[22] Filed: Nov. 3, 1969

[21] Appl. No.: 873,705

Related U.S. Application Data

[63] Continuation-in-part of Ser. No. 711,864, March 11, 1968, Pat. No. 3,476,808, which is a continuation-in-part of Ser. No. 639,029, May 17, 1967, abandoned.

[52] U.S. Cl. ..........................260/586 R, 252/463, 260/592, 260/593 R
[51] Int. Cl. .........................................................C07c 45/00
[58] Field of Search ..........252/463; 260/586 R, 592, 593 R, 260/596

[56] References Cited

UNITED STATES PATENTS

| | | | |
|---|---|---|---|
| 2,101,820 | 12/1937 | Woodhouse | 260/601 |
| 3,156,735 | 11/1964 | Armstrong | 260/596 |
| 3,329,724 | 7/1967 | Hargis et al. | 260/593 |
| 3,364,264 | 1/1968 | Hardman et al. | 260/586 R |
| 3,476,808 | 11/1969 | Etherington et al. | 260/586 R |
| 2,955,088 | 10/1960 | Beerbower et al. | 252/476 X |

*Primary Examiner*—Bernard Helfin
*Assistant Examiner*—Norman Morgenstern
*Attorney*—Oswald G. Hayes, Andrew L. Gaboriault and Hastings S. Trigg

[57] ABSTRACT

An improvement is provided in a process in which ketones and mixtures of ketones and alcohols having at lest one pair of hydrogen atoms on the alpha and beta carbon atoms are oxidatively dehydrogenated to the corresponding ethylenically unsaturated ketone by contacting the ketone and molecular oxygen-containing gas with a catalyst containing a metal of Group IB (Cu, Ag, Au) in the vapor phase (400°–750°C.). The catalyst can be a Group IB metal or oxysalt and can be on a support. Gold and supported gold catalysts are particularly preferred. The improvement is in obtaining high selectivity by the use of a supported gold catalyst (1–50 percent gold) in which the support is a clear, transparent, single crystal alpha-alumina having at least 50 percent and preferably 75 percent of its surface area covered with gold.

3 Claims, No Drawings

CATALYTIC OXIDATIVE DEHYDROGENATION OF KETONES WITH IMPROVED SUPPORTED GOLD CATALYST

CROSS-REFERENCES TO RELATED APPLICATIONS

This application is a continuation-in-part of co-pending application serial number 711,864, filed Mar. 11, 1968, now U.S. Pat. No. 3,476,808, which in turn is a continuation-in-part of application serial number 639,029, filed May 17, 1967, and now abandoned.

BACKGROUND OF THE INVENTION

1. FIELD OF THE INVENTION

This invention relates to oxidative dehydrogenation. It is more particularly concerned with selective catalytic oxidative dehydrogenation of ketones to unsaturated ketones.

2. DESCRIPTION OF THE PRIOR ART

Various methods have been proposed to prepare unsaturated ketones, such as 2-cyclohexen-1-one. Many give low yield of product. Others involve reactants that are either relatively expensive or not readily available or both. For example, it has been proposed to oxidize cyclohexen to 2-cyclohexen-1-one (U.S. Pat. Nos. 2,992,272 and 2,369,182). Another procedure involves dehydrobromination of 2-bromocyclohexanone [J. Chem. Soc., 607 (1954)]. The procedure set forth in Organic Syntheses uses 3-ethoxy-2-cyclohexanone as the starting material [Org. Syn., 40, 14 (1960)]. A recent patent (U.S. Pat. No. 3,050,561) described a route using vinyl-cyclohexene. A Birch reduction of anisole gives 2-cyclohexen-1-one in about 20 percent yield in small scale reactions [J. Chem. Soc., 430 (1934)]. Larger scale reactions, however, are very hazardous. Insofar as is now known, it has not been proposed to prepare 2-cyclohexen-1-one or other unsaturated ketones by selective dehydrogenation of the corresponding saturated ketone.

SUMMARY OF THE INVENTION

This invention provides a process for producing an unsaturated ketone that comprises contacting a ketone reactant and a molecular oxygen-containing gas, in the vapor phase, with a catalyst consisting of metallic gold or metallic gold on a support, the improvement that comprises using a supported metallic gold catalyst in which the support is a clear, transparent, single crystal alpha alumina having at least 50 and preferably 75 percent of its surface covered with gold.

DESCRIPTION OF THE SPECIFIC EMBODIMENTS

The ketone reactant used in the oxidative dehydrogenation process is a ketone having at least 1 pair of alpha and beta carbon atoms with at least 1 hydrogen atom on each. It can be an open chain ketone or a cyclic ketone. Typical ketone reactants are: ethylphenyl ketone; butanone (methylethyl ketone); pentanone-2; pentanone-3; hexanone-2; 2-methyl-pentanone-3; heptanone-4; 2,4-dimethylpentanone-3; heptanone-3; 2-methyl-hexanone-5; octanone-3; 4-methylheptanone-5; octanone-2; nonanone-2; nonanone-5; decanone-2; decanone-4; undecanone-2; undecanone-3; tetradecanone-3; cyclopentanone; cyclohexanone; 3-methylcyclohexanone; cycloheptanone; and 2,5-dimethylcyclohexanone. The term "ketone reactant" includes mixtures of ketone and the corresponding alcohol, such as a mixture of cyclohexanone and cyclohexanol.

In the oxidative dehydrogenation process, the molar ratio of molecular oxygen to ketone reactant can be between 0.1 and 3, but preferably it is between 0.2 and 2. Pure oxygen can be used, but generally mixtures containing molecular oxygen are used, such as air, mixtures of air and oxygen, and mixtures of oxygen with nitrogen.

The catalyst utilizable in the oxidative dehydrogenation process comprises a metal of Group IB of the Periodic Chart of the Elements. The Periodic Chart referred to is that appearing on pages 58–59 of Lange's Handbook of Chemistry, seventh edition (1949). The preferred catalysts are metallic. They can be in the form of wire, gauze, pellets or coating on a support. It is also within the contemplation of this invention to use these metals in the form of oxides and oxysalts, usually but not necessarily on support. The catalyst supports can be any inert refractory material such as alumina, silicon carbide, and Alundum When supported, the amount of catalytic metal, oxide, or oxysalt in the catalyst can vary widely between about 1 and about 50 percent or more, by weight. Especially preferred catalysts are metallic gold and supported metallic gold.

The catalyst used in the improved process of this invention is a supported gold catalyst. The support used is a clear, transparent alpha alumina, as shown by examination under an optical microscope. In order to provide good selectivity, it is essential that at least 50 and preferably 75 percent of the surface of the support is covered with metallic gold. If large areas of the support are left uncovered, side reactions occur, including degradation and cracking of cyclohexanone or other ketone reactant. It has been found that catalysts having poor selectivity are obtained when the alpha-alumina support has an unclear cloudy reactant. on examination under an optical microscope. The support surface can be coated with gold by any means known in the art of preparing supported metallic catalysts. For example, clear alpha alumina beads are covered with an aqueous solution of gold trichloride of sufficient concentration to give the desired amount of gold in the finished catalyst. Then, the mixture is evaporated to dryness and the gold salt is reduced to metallic gold. The support can also be coated with a hydrocarbon solution of an organic gold compound, such as gold terpene mercaptide, followed by heating at an elevated temperature in an oxidizing atmosphere.

The oxidative dehydrogenation reaction is carried out in the vapor phase at temperatures varying between about 400°C. and about 750°C., preferably between about 500°C. and about 700°C. The contact time of cyclohexanone with the catalyst can be between about 0.001 sec. and about 20 sec. In the preferred continuous operation, cyclohexanone is charged at a LHSV (Volume liquid charge per volume catalysts per hour) of 0.1 to 20.

Any vessel suitable for carrying out exothermic vapor phase reactions is utilizable herein. The process can be carried out batch wise, but it is more suitably carried out in a continuous process. In such an operation, unreacted ketone reactant can be recycled to extinction, after separation from the product and the small amount of by-product, phenol in the case of cyclohexanone. It should be noted that the phenol by-product has many well known uses, e.g., in manufacture of phenolic resins.

EXAMPLE 1

A copper catalyst was prepared by mixing a solution of 50.7 g. of cupric chloride in 100 g. of distilled water with 270 g. of ⅛ × ⅛ silicon carbide pellets and evaporating the mixture of dryness.

A 75 ml. portion of the dry catalyst was placed in a 24 mm. I.d. × 14 inches long vertically mounted high-silica glass (Vycor) tube reactor containing a concentric 7 mm. Vycor thermocouple well. The portion of the reactor above the catalyst bed was packed with inert pellets to act as a mixing and preheating section. The reactor was enclosed in an electric tube furnace.

The catalyst bed was slowly heated to 500°C. in a stream of air and was maintained at this temperature overnight. A mixture of air and cyclohexanone vapor was passed over the catalyst for several hours to condition the catalyst. A mixture of air and cyclohexanone vapor was then introduced to the reactor at the rates of 0.0062 moles of $O_2$/min. and 0.0046 moles of cyclohexanone/min. The maximum bed temperature was in the range of 618°–630°C. The condensed organic products, after separation of a small aqueous layer, contained 84 percent unreacted cyclohexanone, 13.3 percent 2-cyclohexen-1-one, and approximately 3 percent phenol.

EXAMPLE 2

A 75 ml. bed of silver catalyst (4 percent) silver on ⅛ × ⅛ inches alundum pellets) was placed in a vertically mounted ¾ inch i.d. stainless steel pipe reactor containing a concentric ¼ inch stainless steel thermocouple well. A mixing and preheating bed of inert alumina pellets was placed on top of the catalyst bed. The reactor was heated with an electric tube furnace.

Cyclohexanone was pumped at the rate of 0.62 ml./min. Through a heated transfer line acting as a vaporizer to the top of the reactor where it was mixed with air (525 std. cc./min.) and nitrogen (1,571) std. cc./min. The maximum bed temperature was 575°C. The gaseous reaction mixture leaving the reactor was passed through the series of condensers. The condensed organic product was analyzed by gas chromatography and was found to contain 76 percent cyclohexanone, 18 percent 2-cyclohexen-1-one, and 6 percent phenol.

EXAMPLE 3

In a reactor similar to that of Example 2, the catalyst bed consisted of a 60 ml. section packed with discs of 20 mesh silver gauze. Cyclohexanone was pumped at the rate of 1.57 ml./min. through the vaporizer, was mixed with 1,700 std. cc./min of air and 2,500 std. cc./min. of nitrogen. The maximum catalyst bed temperature was 650°C. The condensate obtained from the reaction mixture after 88.8 g. of cyclohexanone has been fed consisted of 10.4 g. of an aqueous layer and 75.6 g. of an organic layer. The organic layer was analyzed by gas chromatography. It was found to contain 4.8 g. of dissolved water, 49.7 g. of cyclohexanone, 18.5 g. of 2-cyclohexen-1-one, and 2.6 g. of phenol.

EXAMPLE 4

A gold catalyst was prepared by evaporation of a gold trichloride solution (aqueous) in the presence of ⅛ × ⅛ inch pellets of inert alumina <1 M²/g. surface area. The catalyst contained approximately 4 percent gold, calculated as the metal. A 54 ml. portion of the dried catalyst was placed in a ⅝ inch o.d. 14½ inch copper tube reactor in an electric furnace. The catalyst was heated at 400°C. overnight in a stream of air. A mixture of cyclohexanone vapor (0.0033 g. mole/min.) and air (0.0107 g. mole O₂/min.) was passed through the catalyst bed. The maximum bed temperature was measured on the outside wall of the reactor was 560°C. The condensed organic product contained 64.1 percent unreacted cyclohexanone, 30.8 percent 2-cyclo-hexen-1-one, and 5.1 percent other products, mostly phenol.

EXAMPLE 5

In a reactor similar to that of Example 2, the catalyst bed consisted of a 32 ml. section packed with ¼ inch lengths of 30 gauge wire. Cyclohexanone was pumped at the rate of 1.45 ml./min. through the vaporizer, was mixed with 1,800 std. cc./min. of air and 2,500 std. cc./min. of nitrogen. The maximum catalyst bed temperature was 600°C. The condensate obtained from the reaction after 130.4 g. of cyclohexanone had been fed consisted of 102 g. of cyclohexanone, 25.7 g. of 2-cyclohexen-1-one, 1.5 g. of phenol and 1.5 g. of water, by gas chromatographic analysis.

EXAMPLE 6

In a titanium pipe reactor similar in design to the stainless steel pipe reactor of Example 2, the catalyst bed was a 32 ml. section packed with a catalyst consisting of 10 percent gold on a 3/16 inch spherical ceramic support. Cyclohexanone was pumped at the rate of 2.34 ml./min. through the vaporizer, was mixed with 450 std. ml./min. of air and 2,500 std. ml./min. of nitrogen. The maximum catalyst bed temperature was 600°C. The condensate obtained from the reaction of 203.2 g. of cyclohexanone consisted of 159 g. cyclohexanone, 33.2 g. of 2-cyclohexen-1-one, and 1.8 g. of phenol, and 3.9 g. of water.

The 2-cyclohexen-1-one produced in accordance with this invention is a precursor for manufacture of 4-benzothienyl N-methylcarbamate, a highly effective pesticide. The 2-cyclohexen-1-one can be converted to 3-mercaptocyclohexanone, e.g., by reacting a benzene solution of the cyclohexenone with hydrogen sulfide at room temperature. 3-Mercaptocyclohexanone is then reacted with 2,2-dichloroacetaldehyde at 90°–100°C. in the presence of a protic acid catalyst (HCl) to form 4-oxo-4,5,6,7-tetrahydrobenzothiophene (see U.S. Pat. No. 3,346,591). The 4-oxo-4,5,6,7-tetrahydrobenzothiophene can then be dehydrogenated to 4-hydroxybenzothiophene by several methods such as that of Fieser et al., J. Am. Chem. Soc., 57, 1611 (1935). The 4-hydroxybenzothiophene can then be converted to 4-benzothienyl N-methylcarbamate by methods fully detailed in U.S. Pat. Nos. 3,288,673 and 3,288,808. These patents also demonstrate the pesticidal effectiveness of this material.

As indicated hereinbefore, the process of this invention is applicable to other acyclic and cyclic ketones. The following examples illustrate the use of some other ketones with the preferred metallic gold.

EXAMPLE 7

A reactor described in Example 2 was filled with 70 cc. of ⅛ × ⅛ inch alundum followed by 60 cc. of catalyst consisting of 10 percent gold deposited on 3/16 inch spheres on inert alumina. The reactor was heated with an electric tube furnace.

Cyclopentanone was pumped at the rate of 1.1 ml./min. through a heated transfer line functioning as a vaporizor to the top of the reactor where it was mixed with both air being pumped at the rate of 800 std. cc./min. and nitrogen at 800 std. cc./min. The mixture of the gases then passed through the heated catalyst bed. The maximum temperature of the catalyst bed was 566°C. The product contained 20.2 percent 2-cyclopenten-1-one, and 79.3 percent unreacted cyclopentanone.

EXAMPLE 8

With the same reactor as in Example 7, 3-methylcyclohexanone, fed at 1 ml./min., air fed at 700 std. cc./min., and nitrogen fed at 700 std. cc./min. were preheated, mixed, and then passed through the reactor. The maximum temperature of the catalyst bed was 572°C. The organic product contained 12.4 percent 5-methyl-2-cyclohexen-1-one, 9.2 percent 3-methyl-2-cyclohexen-1-one, and 78.4 percent unreacted 3-methylcyclohexanone.

EXAMPLE 9

With the same reactor as in Example 7, heptan-4-one, fed at 1 ml./min., air fed at 800 std. cc./min., and nitrogen fed at 800 std. cc./min were preheated, mixed, then passed through the reactor. The maximum temperature of the catalyst bed was 552°C. The product contained 9.9 percent 2-haptene-4-one, 1.9 percent 2,5-heptadien-4-one, and 86 percent unreacted heptan-4-one.

EXAMPLE 10

A reactor similar to that of Example 2 was filled with 110 cc. of catalyst consisting of 10 percent gold deposited on 3/16 inch spheres of inert carriers. Ethyl phenyl ketone, fed at 0.6 ml./min., air fed at 800 std. cc./min., and nitrogen fed at 800 std. cc./min. were preheated, mixed and then passed through the reactor. The maximum temperature of the catalyst bed was 620°C. The product contained 45.4 percent phenol vinyl ketone and 52.4 percent unreacted ethyl phenyl ketone.

EXAMPLE 11

A reactor similar to that of Example 2, except 18 inches in length, was filled with 32 cc. of 30 gauge gold wire cut into ¼ inch in length.

Methyl ethyl ketone, fed at 1.8 ml./min., air fed at 1,800 std. cc./min., and nitrogen fed at 2,500 std. cc./min. were preheated, mixed, and then passed through the reactor. The maximum temperature of the catalyst bed was 600°C. The product contained 7.8 percent methyl vinyl ketone, 1.3 percent 2,3-butanedione, and 90.8 percent unreacted methyl ethyl ketone.

The following examples demonstrate a method of catalyst preparation and runs with a good catalyst and with an unsatisfactory catalyst with the results of examination of these catalysts.

EXAMPLE 12

To a solution of 18 g. of chlorauric acid ($HAuCl_4 \cdot H_2O$) in 100 ml. of water were added 200 g. of ⅛ inch spheres of clear alpha alumina. The mixture was heated with stirring until it had been evaporated to dryness. The dried spheres were placed in a reactor and heated at 300°–400°C. in a stream of air for about 16 hours (overnight).

EXAMPLE 13

A 150 ml., 5 inch deep bed of a 10% gold on alumina catalyst (designated Catalyst A) was placed in a 1 ½ inch I.D. stainless steel reactor. Air fed at 12 cu.ft./hr., nitrogen fed at 30 cu.ft./hr., and cyclohexanone fed at 25 ml./min. were preheated, premixed, and passed through the catalyst bed for 12 hours. The maximum catalyst bed temperature was 1,105°F. (596°C.). Liquid product recovery was 96.2 percent. Of the liquid recovered, 14.7 percent was 2-cyclohexen-1-one, 82.5 percent was unreacted cyclohexanone, and less than 0.5 percent phenol. The conversion was 20.5 percent and selectivity to 2-cyclohexen-1-one was 70 percent.

EXAMPLE 14

In the reactor described in Example 13 was placed a 150 ml., 5 inch deep bed of a different 10 percent gold on alumina catalyst (designated Catalyst B). Air fed at 15 cu.ft./hr., nitrogen fed at 30 cu.ft./hr., and cyclohexanone fed at 25 ml./min. were preheated, premixed, and passed through the catalyst bed for 12 hours. The maximum catalyst bed temperature was 1,050°F. (566°C.). Liquid product recovery was 87 percent. Of the liquid recovered 5.5 percent was 2-cyclohexen-1-one, 92 percent was unreacted cyclohexanone, and less than 0.5 percent was phenol. The conversion was 21.7 percent and the selectivity to 2-cyclohexen-1-one was 17.7 percent.

It is to be noted that Catalyst A was much more selective than Catalyst B. The unrecoverable non-condensables of 13 percent (Example 14) were degradation products including $CO$, $CO_2$, and $C_1$–$C_4$ hydrocarbons. In order to determine why two apparently similar catalysts behaved in such a different manner, they were examined by microscope and by X-ray diffraction.

EXAMPLE 15

A sample of each of Catalysts A and B was examined under an optical microscope. In the case of Catalyst A, the support was clear, transparent single crystal alpha-alumina and about 75 percent of the surface was covered with gold. In the case of the Catalyst B, the support was a milky alpha-alumina and only about 25 percent of the surface was covered with gold. As indicated by X-ray diffraction, the gold average crystallite size was about 250 A. in Catalyst A and about 450 A. in Catalyst B.

As was indicated hereinbefore, the process of this invention is applicable to mixtures of cyclohexanone and cyclohexanol, illustrated in the following example.

EXAMPLE 16

Through a ½ inch diameter, 7 inch long stainless steel reactor containing 10 ml. of ¼ inch long pieces of 30 gauge gold wire (equivalent in performance to Catalyst A, Example 13) was passed 65.8 g. of an equimolar mixture of cyclohexanol and cyclohexanone over a two-hour period. The air flow was 260 ml./min., and nitrogen flow was 260ml./min. Maximum catalyst bed temperature was 550°C. The liquid product contained 1 percent cyclohexene, 62.2 percent cyclohexanone, 28.2 percent cyclohexanol, 7.1 percent 2-cyclohexen-1-one, and 1.3 percent phenol.

Although the present invention has been described with preferred embodiments, it is to be understood that modifications and variations may be resorted to, without departing from the spirit and scope of the invention, as those skilled in the art will readily understand. Such variations and modifications are considered to be within the purview and scope of the appended claims.

What is claimed is:

1. In a process for producing an unsaturated ketone that comprises contacting a ketone reactant selected from the group consisting of ethyl phenyl ketone, butanone, pentanone-2, pentanone-3, hexanone-2, 2-methylpentanone3, heptanone-4, 2,4-dimethylpentanone3, heptanone-3, 2-methylhexanone-5, octanone-3, 4-methylheptanone-5, octanone-2, nonanone-2, nonanone-5, decanone-2, decanone-4, undecanone-2, undecanone-3, tetradecanone-3, cyclopentanone, cyclohexanone, a mixture of cyclohexanone and cyclohexanol, 3-methylcyclohexanone, cycloheptanone, and 2,5-dimethylcyclohexanone and a molecular oxygen-containing gas, in the vapor phase, with a catalyst consisting essentially of metallic gold on a support, at a temperature of between about 400°C. and about 750°C. and for a contact time of between about 0.001 sec. and about 20 sec., the improvement that comprises using a supported metallic gold catalyst in which the support is a clear single crystal alpha alumina having at least 50 percent of its surface covered with gold.

2. The method defined in claim 1, wherein said ketone reactant is cyclohexanone or a mixture of cyclohexanone and cyclohexanol.

3. The method defined in claim 1, wherein the catalyst is a clear single crystal alpha alumina having 75 percent of its surface covered with gold.

* * * * *

PO-1050
(5/69)

UNITED STATES PATENT OFFICE
CERTIFICATE OF CORRECTION

Patent No. 3,673,255            Dated June 27, 1972

Inventor(s) Robert W. Etherington Jr. and Loei-Liang Liauw

It is certified that error appears in the above-identified patent and that said Letters Patent are hereby corrected as shown below:

Col. 1   Line 46    "least 50" should be --least 50 percent--

Col. 2   Line 7    Should be a period (.) after Alundum

Col. 2   Line 8    "about 1" should be --about 1 percent--

Col. 2   Line 16    "least 50" should be --least 50 percent--

Col. 2   Line 22    "cloudy reactant" should be --cloudy appearance--

Col. 2   Line 55    "1/8 X 1/8" should be --1/8" X 1/8"--

Col. 2   Line 55    "of dryness" should be --to dryness--

Signed and sealed this 6th day of March 1973.

(SEAL)
Attest:

EDWARD M. FLETCHER, JR.          ROBERT GOTTSCHALK
Attesting Officer                 Commissioner of Patents